No. 773,921. PATENTED NOV. 1, 1904.
E. B. CAMPBELL.
SUCKER ROD JOINT.
APPLICATION FILED JULY 11, 1904.
NO MODEL.

Witnesses
K. Lockwood Nevins
Bessie Sorjinkel

Inventor
E. B. Campbell
By F. M. Wright
Attorney

No. 773,921. Patented November 1, 1904.

UNITED STATES PATENT OFFICE.

EMERSON B. CAMPBELL, OF BAKERSFIELD, CALIFORNIA.

SUCKER-ROD JOINT.

SPECIFICATION forming part of Letters Patent No. 773,921, dated November 1, 1904.

Application filed July 11, 1904. Serial No. 216,019. (No model.)

*To all whom it may concern:*

Be it known that I, EMERSON B. CAMPBELL, a citizen of the United States, residing at Bakersfield, in the county of Kern and State of California, have invented certain new and useful Improvements in Sucker-Rod Joints, of which the following is a specification.

My invention relates to improvements in joints for sucker-rods of wells, and particularly of oil-wells, my present invention being an improvement for that upon which a patent was granted to me July 28, 1903, No. 735,030. In said patent it was stated that theretofore it had been difficult to maintain the sections of sucker-rods connected on account of the tendency of the sections to unscrew from the joint, this tendency being permitted by the fact that the ends of the rods were not brought into contact with each other. That invention consisted, broadly, in providing a medium of escape for the oil and sand shut in within the joint between the two ends of the rod, so that no longer was there any cushion between the ends of the rods, but they were able to be screwed into firm contact with each other, whereby the friction between these surfaces overcame the tendency to unscrew. The specific means there shown for providing a medium of escape for the oil and sand consisted of a hole bored laterally through the union substantially at the center thereof. This construction while effective for the purpose desired necessitates a certain amount of care in connecting the union with the ends of the rods, so that said ends may come opposite to the hole bored in the union. If the end of either rod passes said hole, then some sand and oil will be inclosed between the ends of the rods and within the union and the object of the invention will be defeated.

My present invention is intended to provide a construction which will avoid the necessity of this care on the part of the operator.

Figure 1:
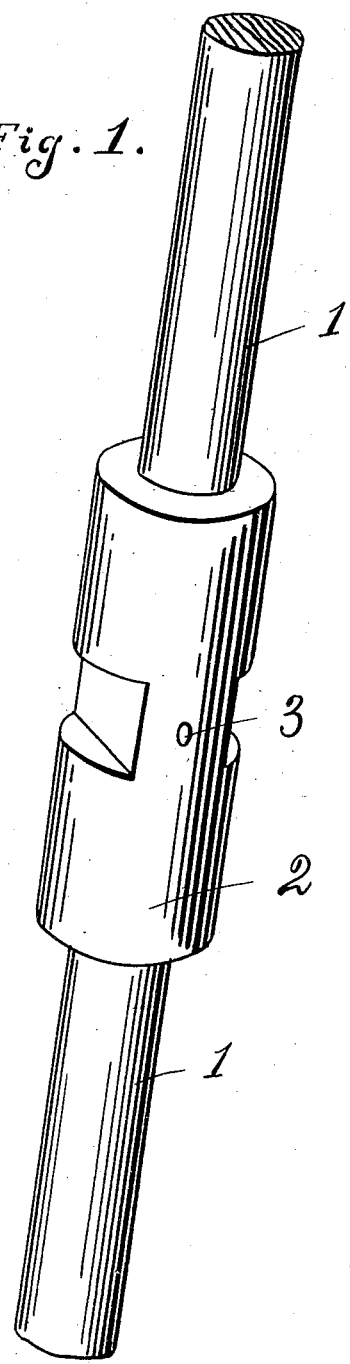
Figure 2:
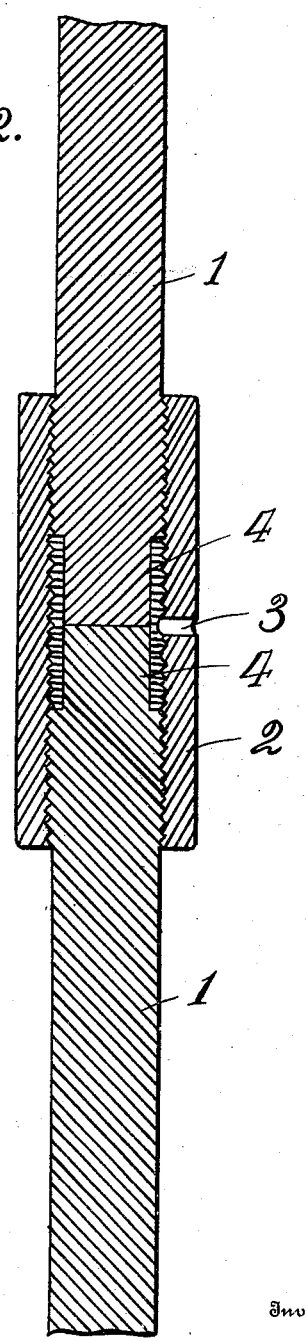

In the accompanying drawings, Figure 1 is a perspective view of a sucker-rod joint and the terminal portions of two rods connected thereby. Fig. 2 is a longitudinal section thereof.

Referring to the drawings, 1 represents sucker-rods, and 2 the joint or union connecting the same. This joint has a hole 3 bored in one side thereof, the same as in my patent above referred to. The change in construction is in the sucker-rods. These are now made with reduced ends, as shown at 4, thus leaving a space between said reduced ends and the inner surface of the union. With this construction it is immaterial whether or not the end of either of the rods passes the hole 3, because the oil and sand still has an opportunity of escaping from between the ends of the rods to and through said hole by means of the vacant space between the reduced ends of the rods and the inner surface of the joint.

I claim—

In combination with a coupling for sucker-rod sections having a small lateral perforation and having a substantially smooth surface around the outer end of said perforation, sucker-rod sections having threaded portions screwed into said coupling, the extreme ends of said sections, beyond said threaded portions, being reduced in diameter, permitting a free passage to said perforation from the space between the ends of the rods, substantially as described.

In witness whereof I have hereunto set my hand in the presence of two subscribing witnesses.

EMERSON B. CAMPBELL.

Witnesses:
   A. WEABER,
   N. L. BARBER.